(12) United States Patent
Wako

(10) Patent No.: US 9,491,980 B2
(45) Date of Patent: Nov. 15, 2016

(54) LATCHING MECHANISM AND HELMET

(71) Applicant: SHOEI CO., LTD., Tokyo (JP)

(72) Inventor: Masanori Wako, Chiba (JP)

(73) Assignee: SHOEI CO., LTD., Tokyo (JP)

(*) Notice: Subject to any disclaimer, the term of this patent is extended or adjusted under 35 U.S.C. 154(b) by 95 days.

(21) Appl. No.: 14/619,561

(22) Filed: Feb. 11, 2015

(65) Prior Publication Data

US 2015/0250252 A1 Sep. 10, 2015

(30) Foreign Application Priority Data

Mar. 5, 2014 (JP) .................. 2014-042849

(51) Int. Cl.
| | |
|---|---|
| *A42B 3/22* | (2006.01) |
| *A42B 3/32* | (2006.01) |
| *F16B 21/02* | (2006.01) |
| *F16B 3/00* | (2006.01) |
| *F16B 2/22* | (2006.01) |
| *A42B 3/04* | (2006.01) |

(52) U.S. Cl.
CPC ............... *A42B 3/221* (2013.01); *A42B 3/223* (2013.01); *A42B 3/227* (2013.01); *A42B 3/324* (2013.01); *F16B 2/22* (2013.01); *F16B 3/00* (2013.01); *F16B 21/02* (2013.01); *Y10T 403/7007* (2015.01)

(58) Field of Classification Search
CPC .................. A42B 3/127; A42B 3/281; A42B 3/227; A42B 3/328; A42B 3/283; A42B 3/08; A42B 3/222; A42B 3/326; A42B 3/226; A42B 3/32; A42B 3/223; A42B 3/324

See application file for complete search history.

(56) References Cited

U.S. PATENT DOCUMENTS

| | | | | |
|---|---|---|---|---|
| 3,239,842 A | * | 3/1966 | Marchello | A42B 3/16 2/10 |
| 4,115,874 A | * | 9/1978 | Hasegawa | A42B 3/281 2/171.3 |
| 4,519,099 A | * | 5/1985 | Kamiya | A42B 3/227 2/171.3 |

(Continued)

FOREIGN PATENT DOCUMENTS

| | | |
|---|---|---|
| CN | 202168482 | 3/2012 |
| GB | 998695 | 7/1965 |
| WO | 2012/047936 | 4/2012 |

*Primary Examiner* — Bobby Muromoto, Jr.
(74) *Attorney, Agent, or Firm* — Greenblum & Bernstein, P.L.C.

(57) ABSTRACT

A latching mechanism including a pedestal provided with a first hole on the surface, a second member provided with a second hole opened at a position overlapping with the first hole, and a fastening member whose one end part is inserted into and pulled from the first hole through the second hole, so that the second member is engaged with the pedestal in an attachable and detachable manner. In the mechanism, the fastening member is inserted through the second hole into the first hole and then rotated such that an outer shape of the one end part intersects with one of the first hole and the second hole so that the second member is mounted onto the pedestal, and then it is rotated further or reversely so that the second member is separated from the pedestal.

16 Claims, 14 Drawing Sheets

(56) References Cited

U.S. PATENT DOCUMENTS

| | | | | |
|---|---|---|---|---|
| 4,700,411 A | * | 10/1987 | Kawasaki | A42B 3/283 2/171.3 |
| 4,724,549 A | * | 2/1988 | Herder | A42B 3/065 2/411 |
| 5,157,794 A | * | 10/1992 | Kamata | A42B 3/281 2/424 |
| 5,862,528 A | * | 1/1999 | Saijo | A42B 3/124 2/411 |
| 5,867,840 A | * | 2/1999 | Hirosawa | A42B 3/281 2/414 |
| 5,987,651 A | * | 11/1999 | Tanaka | A42B 3/223 2/424 |
| 6,009,561 A | * | 1/2000 | Bullock | A42B 3/227 2/12 |
| 6,105,172 A | * | 8/2000 | Shida | A42B 3/24 2/171.3 |
| 6,226,803 B1 | * | 5/2001 | Tanaka | A42B 3/326 2/424 |
| 6,256,797 B1 | * | 7/2001 | Nemoto | A42B 3/328 2/414 |
| 6,289,521 B1 | * | 9/2001 | Ikeda | A42B 3/105 2/421 |
| 6,405,382 B2 | * | 6/2002 | Shida | A42B 3/283 2/171.3 |
| 6,417,491 B1 | * | 7/2002 | Taniuchi | A42B 3/24 2/424 |
| 6,421,841 B2 | * | 7/2002 | Ikeda | A42B 3/283 2/267 |
| 6,910,228 B2 | * | 6/2005 | Tanaka | A42B 3/283 2/171.3 |
| 6,925,657 B2 | * | 8/2005 | Takahashi | A42B 3/28 2/412 |
| 7,376,981 B2 | * | 5/2008 | Shida | A42B 3/326 2/424 |
| 7,735,157 B2 | * | 6/2010 | Ikeda | A42B 3/281 2/410 |
| 7,735,158 B2 | * | 6/2010 | Tsurumi | A42B 3/283 2/410 |
| 7,805,775 B2 | * | 10/2010 | Ikeda | A42B 3/105 2/411 |
| 7,854,023 B2 | * | 12/2010 | Ando | A42B 3/127 2/414 |
| 8,032,946 B2 | * | 10/2011 | Ishikawa | A42B 3/24 2/410 |
| 8,069,499 B2 | * | 12/2011 | Isobe | A42B 3/222 2/15 |
| 8,087,099 B2 | * | 1/2012 | Sawabe | A42B 3/127 2/411 |
| 8,176,575 B2 | * | 5/2012 | Tsuzuki | A42B 3/24 2/171.3 |
| 8,239,970 B2 | * | 8/2012 | Ikeda | A42B 3/127 2/267 |
| 8,800,065 B2 | * | 8/2014 | Ikeda | A42B 3/328 2/411 |
| 8,869,354 B2 | * | 10/2014 | Horimoto | A42B 3/08 24/69 ST |
| 9,032,548 B2 | * | 5/2015 | Isobe | A42B 3/222 2/10 |
| 9,182,208 B2 | * | 11/2015 | Ebisawa | A42B 3/127 |

\* cited by examiner

F I G. 1
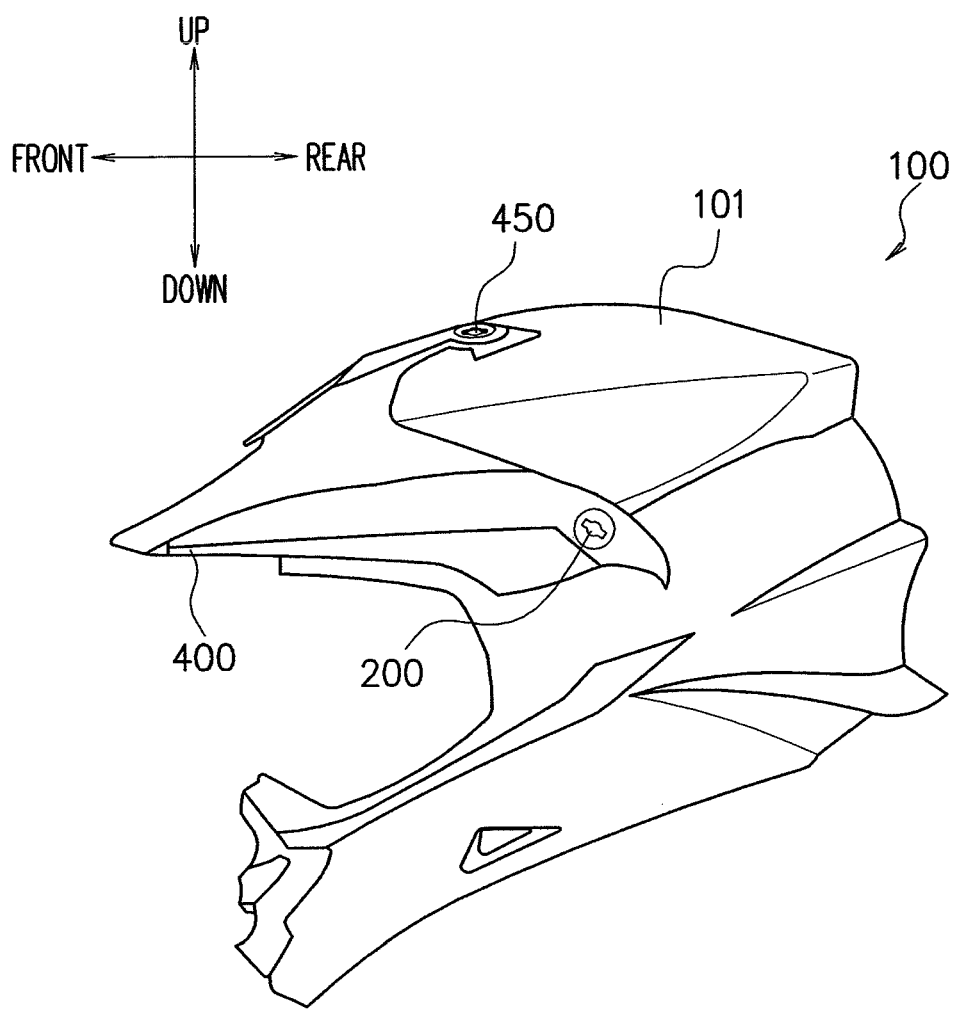

F I G. 2
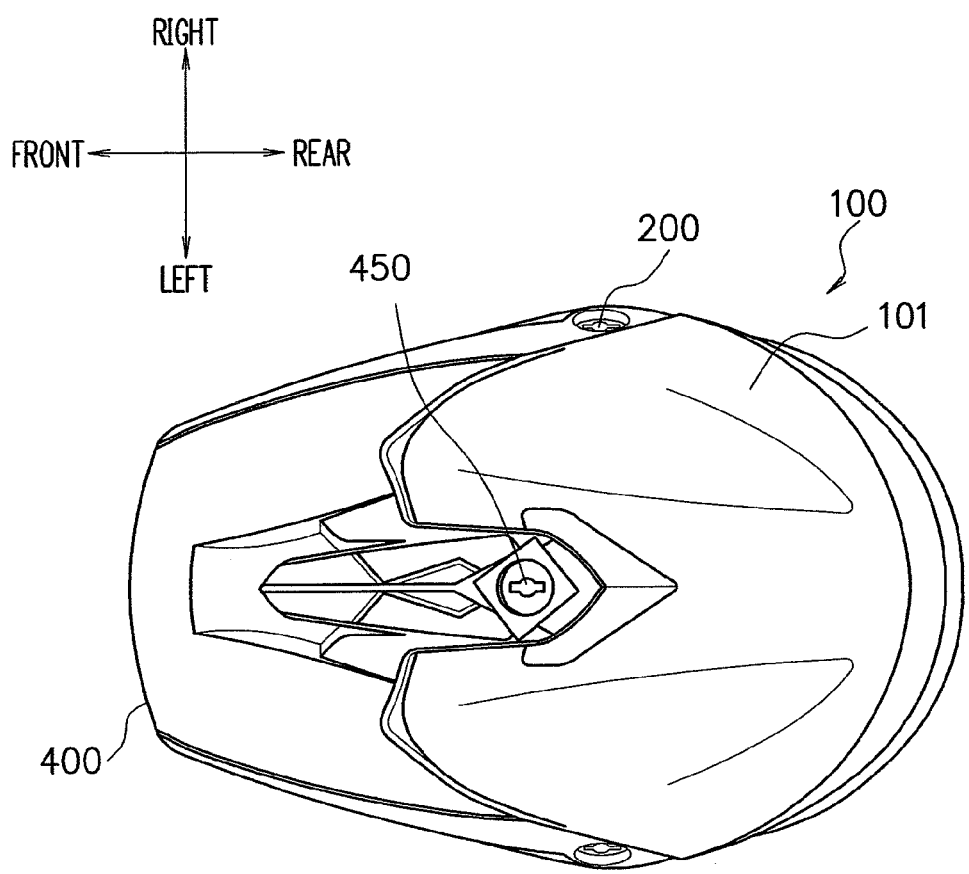

F I G. 5
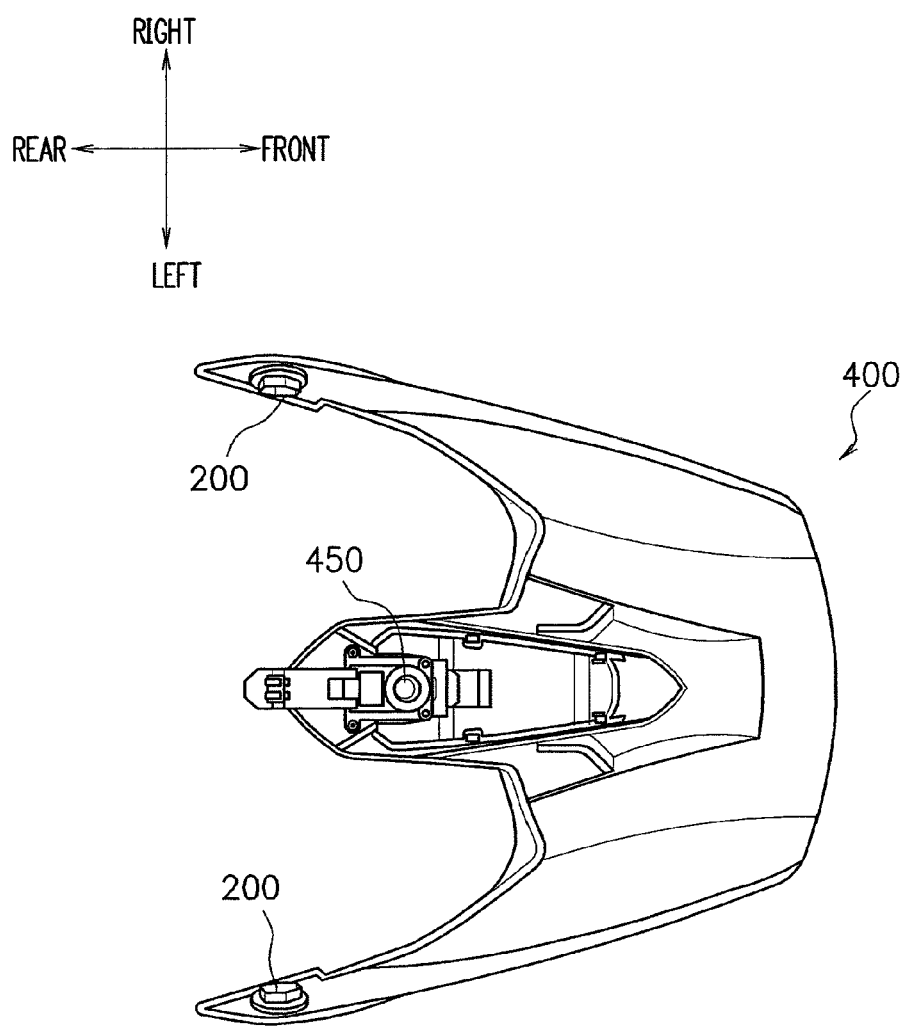

F I G. 8A
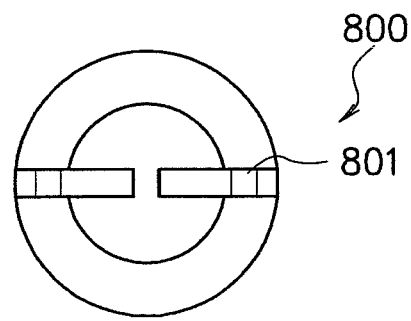
F I G. 8B
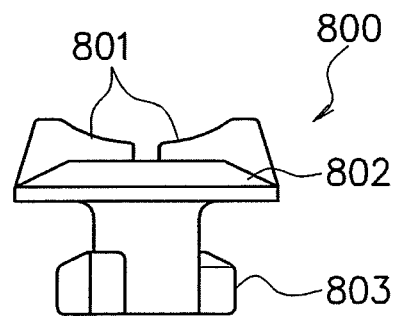
F I G. 8C
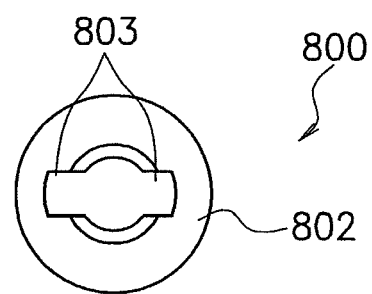

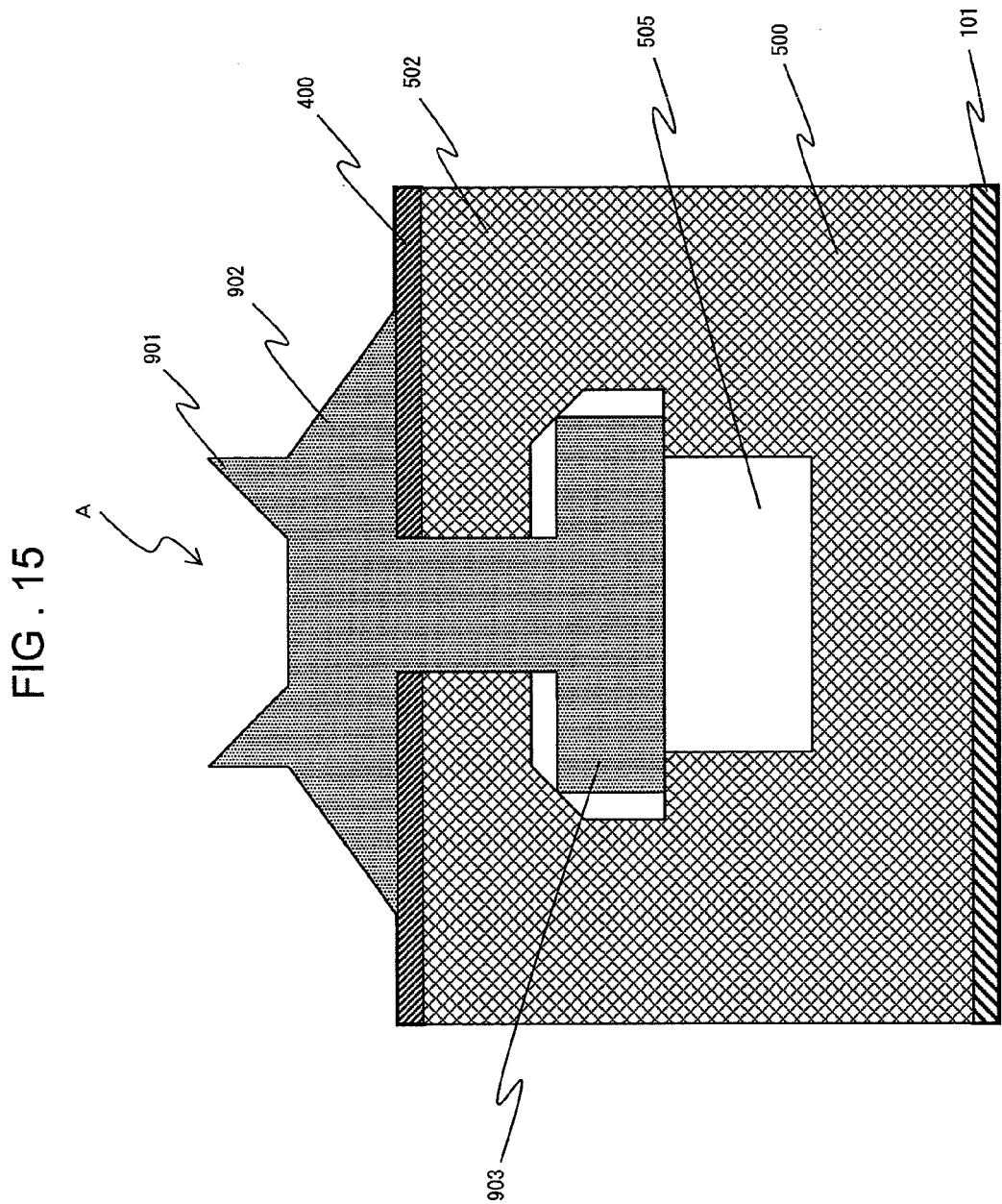

LATCHING MECHANISM AND HELMET

BACKGROUND OF THE INVENTION

1. Field of the Invention

The present invention relates to a latching mechanism for helmet components and a helmet.

2. Related Art

The present invention relates to: a latching mechanism for a component, such as a visor, of a helmet for motorcycle rider; and a helmet.

In running on a motorcycle, especially in off-road races in which means to travel on the rough ground, a motorcycle rider receives large vibrations through the motorcycle or takes large actions for maintaining a balance on the motorcycle. This causes a large amount of physical exertion in the rider. Thus, the elements for a rider selecting a helmet include lightweight, easy breathing, large view field, and airy coolness.

Then, in many cases, the motorcycle helmet is mounted a component such as a shield, goggles, and so on. Generally a visor (i.e. helmet peak) is attached on the helmet such as to protrude from a forehead portion of a helmet to a lower front side. This visor serves as a sunshade or the like for avoiding a situation that late afternoon sunlight or the like enters the eyes. Besides, this visor has the function of protecting the rider's face from a rain or a mud.

Further, the off-road races require the high-speed running in a muddy environment during rain and in a sandy dust. Thus, muddy water, sandy dust, gravels, and the like kicked up by the preceding runners continue violently hitting the face of a following rider. In this situation, the rider need perform acceleration and deceleration, handle operation, and the like with observing irregular ups and downs, curves, surrounding situations, road surfaces, and the like in the forward direction of the course. Thus, a satisfactory field of view need be ensured in the forward and upper regions and hence remarkably difficult running is caused.

Thus, the visor is required not to block the rider's field of view excessively, yet, the sunlight or the muddy water and the like kicked up from the road surface is prevented from directly entering the rider's eyes, and further to be attached and detached easily.

In the prior art, a metal hook has been employed as a method of attaching a visor to a helmet. As disclosed in U.S. Pat. No. 3,239,842 (Patent Document 1), in general, a male fitting is embedded in the helmet. Further, U.S. Pat. No. 4,700,411 (Patent Document 2) discloses a configuration that a nut is embedded in a helmet and then a visor is placed thereon and then fastened with a bolt.

Another fastening method is to employ a permanent magnet as disclosed in the International Publication No. WO 2012/047936 (Patent Document 3). Further, a method in which a fixture is not embedded in a helmet is described in China Utility Model Publication No. 202168482 (Patent Document 4). In this method, in a base plate provided with a keyhole-shaped hole having the shape of two mutually connected circles of which one is large and another is small, a cylindrical pin is inserted into the large circle part and then the pin is moved to the small circle part with causing deformation in the connection part between the two circles. The size of the cylinder cross-section of the pin is almost the same as the small circle and hence the pin is held there. Since the cylindrical pin is installed on the inside of the visor, the visor can be attached and detached when the visor is merely moved forward and backward on the helmet. In general, this attachment method is employed in a hammock provided in the inside of an industrial helmet (a helmet used in construction sites or in factory work).

Further, as described in GB Patent No. 998695 (Patent Document 5), a small circle of a hammock in the inside of an industrial helmet is hooked to a cylindrical pin inserted into the helmet.

SUMMARY OF THE INVENTION

Nevertheless, in the method disclosed in Patent Document 1, the fixing force is weak, is sufficient for a small visor but insufficient for holding a large visor for motocross, and has a problem consequently that the visor easily drops off when blown by a wind pressure during traveling. Further, even though the fastening force between the visor and the helmet is increased by increasing the number of hooks or the like, a problem arises that the male fitting embedded in the helmet drops off from the helmet when detaching the visor.

Further, if the male fitting of the hook is given a small shock, the tubular cylindrical portion is deformed or crushed so that the shock is attenuated to a certain extent. Nevertheless, if a large shock is given, there is a risk that the hook is pushed into the helmet. Thus, in particular, the typical visors for the motocross helmets have been fastened with a bolt and a nut made of metal or hard plastic.

Further, in the attachment method with a bolt and a nut described in Patent Document 2, a problem arises that when a wrong bolt is forcedly pushed into the nut (e.g., misidentification of an inch screw and a centimeter screw) or alternatively when the bolt is pushed obliquely into the nut, the nut is damaged or dented into the helmet.

Further, in the attachment method described in Patent Document 3, the metal hook is merely replaced by the magnet. Thus, a problem similar to that in Patent Document 2 arises. In particular, as the hard magnet portion has no attenuation effect such as the tubular portion of the previous hook, the risk cannot be avoided that the magnet portion is pushed into the helmet by a shock. Further, when a force acts in perpendicular to the line of magnetic force or alternatively when sandy dust or the like adheres to the magnet surface so that the line of magnetic force is cut off, the risk arises that the visor drops off unintentionally. In Patent Documents 2 and 3, an attachment fixture is embedded in a helmet and hence a trouble can occur that the fixture is pushed into the helmet.

Further, in the connection method described in Patent Document 4, the visor can be attached and detached by a force of deforming the middle portion between the two circles. Thus, the force of holding the visor is insufficient, in particular, for a motocross helmet, because the helmet and the visor receive a large wind pressure and large vibrations when the rider takes large actions so as to maintain the balance in order to alleviate a shock from ups and downs of the ground surface. In such situations, a problem arises that the visor cannot be held.

Further, in the attachment method described in Patent Document 5, since the hammock is pulled upward so that a tension acts on the fastening part between the small circle and the pin during the use of the helmet, the visor does not drops off. In contrast, in the connection method described in Patent Document 4, there is no additional function thought out for assisting the connection force between the small circle and the pin is not added. Thus, a problem arises that the visor cannot satisfactorily be held and hence the visor easily drops off during the traveling.

Thus, the present invention has been devised in view of such problems in the prior art described above. An object thereof is to provide a latching mechanism for helmet components and a helmet in which a situation that a fixture is pushed into the helmet is avoided, yet, the safety of the latching mechanism is improved and the visor can be attached and detached more easily in a shorter time than fastening with a bolt and a nut.

The latching mechanism for resolving the above-mentioned problems according to the present invention is characterized by a latch mechanism including: a pedestal fixed on a surface of a first member and provided with a first hole in a substantial center part viewed from a position immediately above the surface; a second member placed on a surface of the pedestal and provided with a second hole substantially congruent to the first hole and opened at a position overlapping with the first hole; and a fastening member whose one end part is inserted into and extracted from the first hole through the second hole so that the second member is attached to the pedestal in an attachable and detachable manner, wherein the one end part is inserted through the second hole into the first hole and then the other end part opposite to the one end part is rotated about an axis in a direction of the insertion such that an outer shape of the one end part viewed from the direction of insertion intersects with an outer shape of the first hole and the second hole, so that the second member is mounted onto the pedestal, and wherein the other end part is rotated about an axis in a direction of the insertion such that the outer shape of the one end part viewed from the direction of insertion agrees with the outer shape of the first hole and the second hole, so that the second member is separated from the pedestal.

Further, the latching mechanism according to the present invention is characterized in that, in the above-mentioned latching mechanism, the pedestal includes: an attaching part for fixing to a surface of the first member; and a ridge part for supporting the second member.

Further, the latching mechanism according to the present invention is characterized in that, in the above-mentioned latching mechanism: the one end part is a leg part inserted into the first hole and the second hole; the other end part is a knob part used for the rotating; and a neck part is included that connects the one end part to the other end part and that is in contact with a surface of the second member.

Further, the helmet for resolving the above-mentioned problems according to the present invention is characterized by a helmet provided with a latch mechanism including: a pedestal fixed on a surface of a shell and provided with a first hole in a substantial center part viewed from a position immediately above the surface; a visor placed on a surface of the pedestal and provided with a second hole substantially congruent to the first hole and opened at a position overlapping with the first hole; and a fastening member whose one end part is inserted into and extracted from the first hole through the second hole so that the visor is attached to the pedestal in an attachable and detachable manner, wherein the one end part is inserted through the second hole into the first hole and then the other end part opposite to the one end part is rotated about an axis in a direction of the insertion such that an outer shape of the one end part viewed from the direction of insertion intersects with an outer shape of the first hole and the second hole, so that the visor is mounted onto the pedestal, and wherein the other end part is rotated about an axis in a direction of the insertion such that the outer shape of the one end part viewed from the direction of insertion agrees with the outer shape of the first hole and the second hole, the visor is separated from the pedestal.

Further, the helmet according to the present invention is characterized in that, in the above-mentioned helmet, the pedestal includes: an attaching part for fixing to a surface of the shell; and a ridge part for supporting the visor.

Further, the helmet according to the present invention is characterized in that, in the above-mentioned helmet: the one end part is a leg part inserted into the first hole and the second hole; the other end part is a knob part used for the rotating; and a neck part is included that connects the one end part to the other end part and that is in contact with a surface of the visor.

Further, the helmet according to the present invention is characterized in that, in the above-mentioned helmet: the visor is provided with a third hole substantially congruent to the second hole and opened at a position overlapping with the first hole; the fastening member is inserted into and extracted from the first hole through the third hole so that the visor is attached to the pedestal in an attachable and detachable manner; the one end part is inserted through the third hole into the first hole and then the other end part is rotated about an axis in a direction of the insertion such that an outer shape of the one end part viewed from the direction of insertion intersects with an outer shape of the first hole and the third hole, so that the visor is mounted onto the pedestal; and the other end part is rotated about an axis in a direction of the insertion such that the outer shape of the one end part viewed from the direction of insertion is superimposed on the outer shape of the first hole and the third hole, the visor is separated from the pedestal.

Further, the helmet according to the present invention is characterized in that, in the above-mentioned helmet: the second hole is provided in a vicinity of a temple part in a situation that the visor is mounted onto the shell; and the third hole is provided in a vicinity of a parietal region in a situation that the visor is mounted onto the shell.

According to the present invention, a latching mechanism for helmet components and a helmet are provided in which the component can be attached and detached easily without causing a situation that a fixture for the helmet component is pushed into the helmet.

BRIEF DESCRIPTION OF THE DRAWINGS

FIG. 1 is a side view showing an external appearance of a helmet to which a visor is attached by employing a latching mechanism according to the present embodiment.

FIG. 2 is a top view showing an external appearance of a helmet to which a visor is attached by employing a latching mechanism according to the present embodiment.

FIG. 5 is a rear view showing an external appearance of a visor to be attached to a helmet by employing a latching mechanism according to the present embodiment.

FIG. 8A shows a top view, FIG. 8B shows a side view and FIG. 8C shows a rear view of an external appearance of a fastening member constituting a latching mechanism according to the present embodiment.

FIG. 15 is an enlarged main part sectional view in a situation that a pedestal constituting a latching mechanism according to another embodiment of the present invention is fixed to a shell, then a visor is placed on the pedestal, and then a fastening member is inserted and then rotated.

DESCRIPTION OF THE EMBODIMENTS

Figure 3:
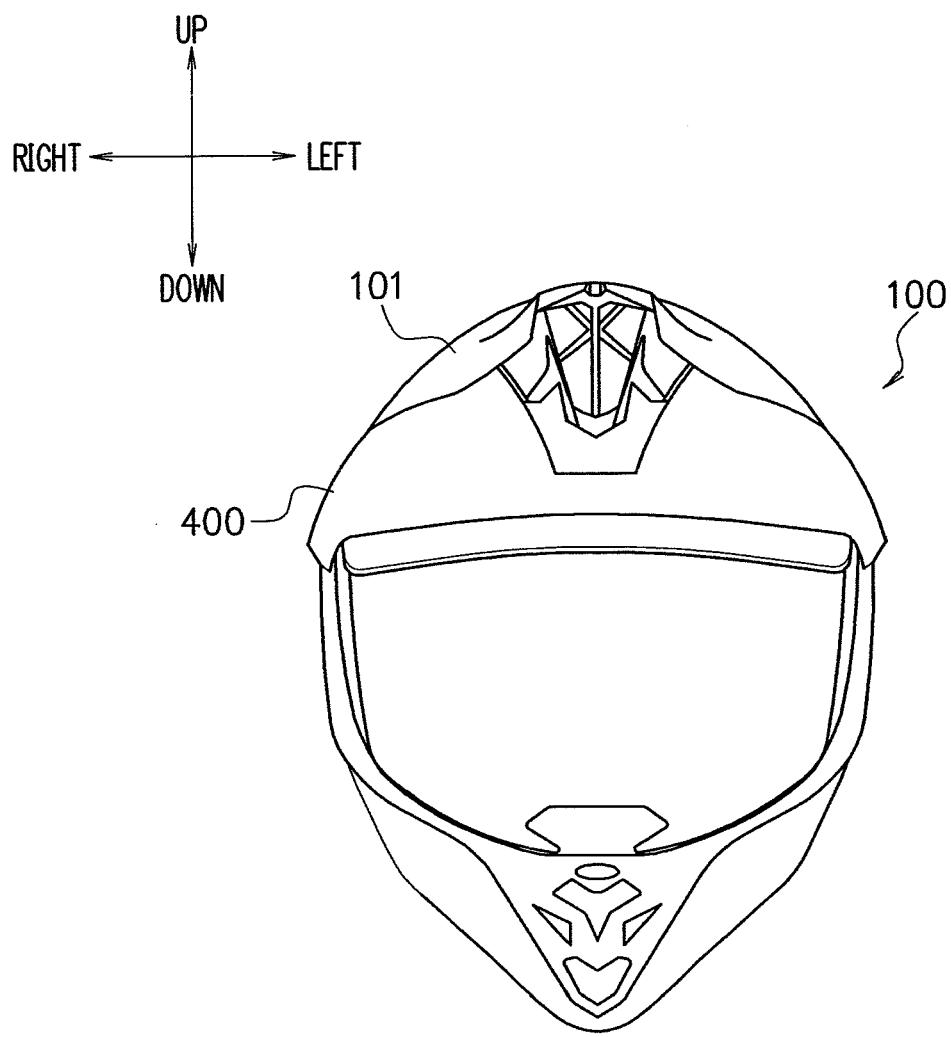
FIG. 3 is a front view showing an external appearance of a helmet to which a visor is attached by employing a latching mechanism according to the present embodiment.

In the present invention, the disadvantages in the above-mentioned attachment methods for helmet components in the prior art are resolved. Description herein is given for a visor which is a typical helmet component. However, the present invention may be applied to a component other than a visor. First, a base plate (a pedestal) serving as a connection part on the helmet side is not embedded in the helmet and is independently arranged on the helmet surface. Further, a connection portion between the base plate and a clip (a fastening member) employs locking achieved by engagement of components rather than locking achieved by flexibility or hardness of the materials.

That is, even when a force such as a wind pressure acts on the components, their connected state is maintained by the connection between the base plate and the clip. Further, even when a large shock acts on the clip portion, the force is transmitted to the connection portion with the base plate. Thus, even in a possible case that the clip is broken or alternatively the locking hole of the base plate is broken so that the visor drops off, the helmet itself is not damaged. Such safety is a feature of the present technique.

A mode of implementing the present invention is described below in detail for an example of a visor with reference to the drawings. Here, in the drawings, identical or like components to each other are designated by identical numerals and hence their duplicated description is simplified or omitted appropriately. The present embodiment is given for a latching mechanism constructed from a clip (a fastening member) and a base plate (a pedestal) connected to the clip and for a helmet employing the same.

Figure 4:
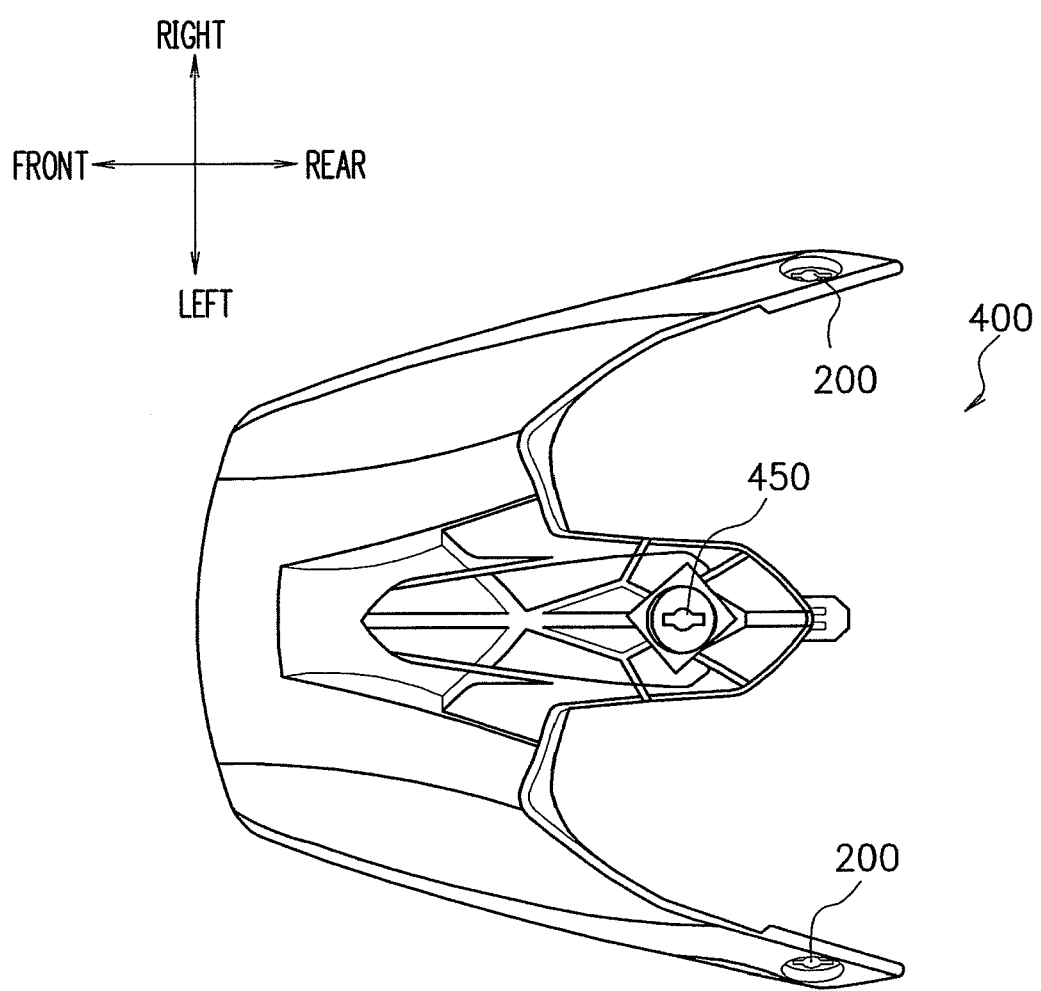
FIG. 4 is a top view showing an external appearance of a visor to be attached to a helmet by employing a latching mechanism according to the present embodiment.

First, description is given for the external appearance of a helmet to which a visor is attached by employing a latching mechanism according to the present embodiment. The shape of the helmet in the figures is exemplary and the shape of the helmet employed for implementing the present invention is not limited to a particular one. FIG. 1 is a side view showing the external appearance of a helmet to which a visor is attached by employing a latching mechanism according to the present embodiment. FIG. 2 is a top view showing the external appearance of the helmet to which the visor is attached by employing the latching mechanism according to the present embodiment. Further, FIG. 3 is a front view showing the external appearance of the helmet to which the visor is attached by employing the latching mechanism according to the present embodiment. FIG. 4 is a top view showing the external appearance of the visor to be attached to the helmet by employing the latching mechanism according to the present embodiment. FIG. 5 is a rear view showing the external appearance of the visor to be attached to the helmet by employing the latching mechanism according to the present embodiment.

In a helmet 100 employing a latching mechanism according to the present embodiment, a visor 400 is attached to an upper frontward part of a shell 101. Attachment parts located in vicinities of the temples at both right and left ends of the visor 400 and in a vicinity of the parietal region are provided respectively with: locking holes (the first holes) 303 (FIG. 6) provided in a base plate (a pedestal) 300 described later; and through holes (the second holes) 200 and a through hole 450 (the third hole) substantially congruent to the locking holes 303. Here, in example of FIGS. 1, 2, and 6, for the purpose of description, the through holes 200 and 450 and the locking holes 303 have the shapes of elongated holes. Instead, as described later, the through holes 200, 450 and the locking holes 303 may have arbitrary shapes such as square shapes and triangular shapes.

After the positions of the through holes 200 and 450 of the visor 400 are overlapped with the positions of the locking holes 303 of the base plate 300, tip parts of clips 800 described later are inserted into the through holes 200 and the locking holes 303, and also into the through hole 450 and the locking hole 303. Then, the clips 800 are rotated to a position where the outer shapes of the tip parts of the clips 800 viewed from the insertion direction intersect with the outer shapes of the through holes 200 and the locking holes 303, and also with the outer shape of the through hole 450 and the locking hole 303, more specifically, to a position where the tip part of each clip 800 abuts against a locking part 304 (FIG. 6B) of the base plate 300. By virtue of this, the visor 400 can be locked and mounted onto the helmet 100.

Besides, when the clips 800 are rotated further or alternatively rotated reversely to a position where the outer shapes of the tip parts of the clips 800 viewed from the insertion direction fit exactly in the outer shapes of the through holes 200 and the locking holes 303, and also with the outer shape of the through hole 450 and the locking hole 303, more specifically, to a position where the tip part of each clip 800 is completely released from an abutment state against the locking part 304 of each base plate 300, the visor 400 can be separated from the helmet 100.

Next, description is given for: a pedestal constituting the latching mechanism according to the present embodiment; a main part in a situation that the pedestal is placed on the shell; a fastening member constituting the latching mechanism; a main part in a situation that the fastening member is inserted into the pedestal and then rotated; a main part in a situation that the pedestal is fixed to the shell and then the fastening member is inserted and then rotated; and a main part in a situation that the pedestal is fixed to the shell, then the visor is placed thereon, and then the fastening member is inserted and then rotated.

Figure 6A:
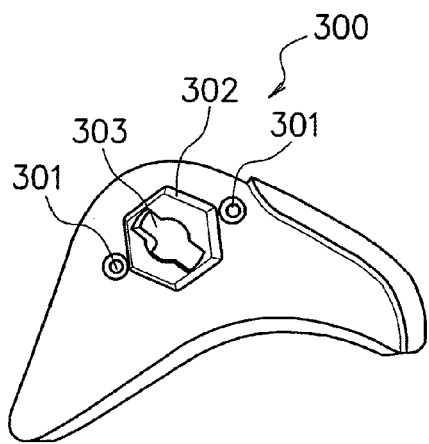
FIG. 6A shows a top view and FIG. 6B shows a rear view of an external appearance of a pedestal constituting a latching mechanism according to the present embodiment.
Figure 6B:
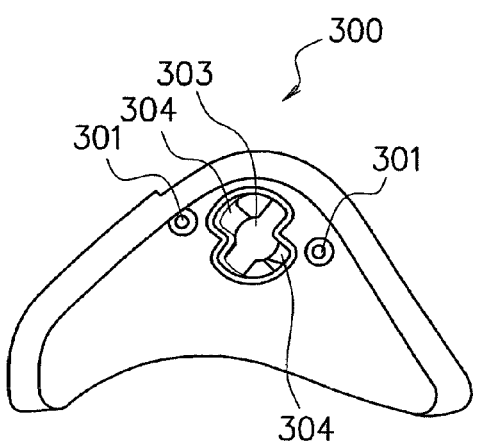
Figure 7:
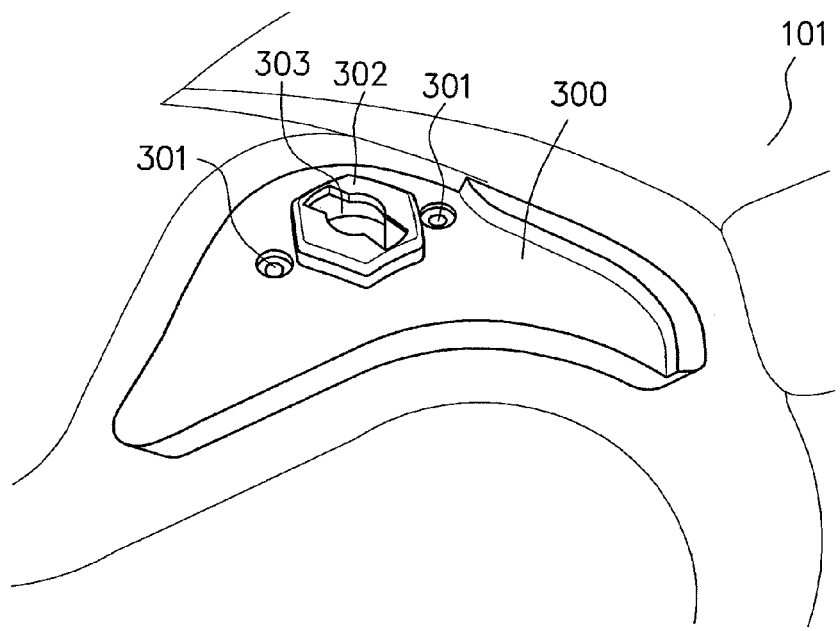
FIG. 7 is an enlarged main part view in a situation that a pedestal constituting a latching mechanism according to the present embodiment is placed on a shell.
Figure 9:
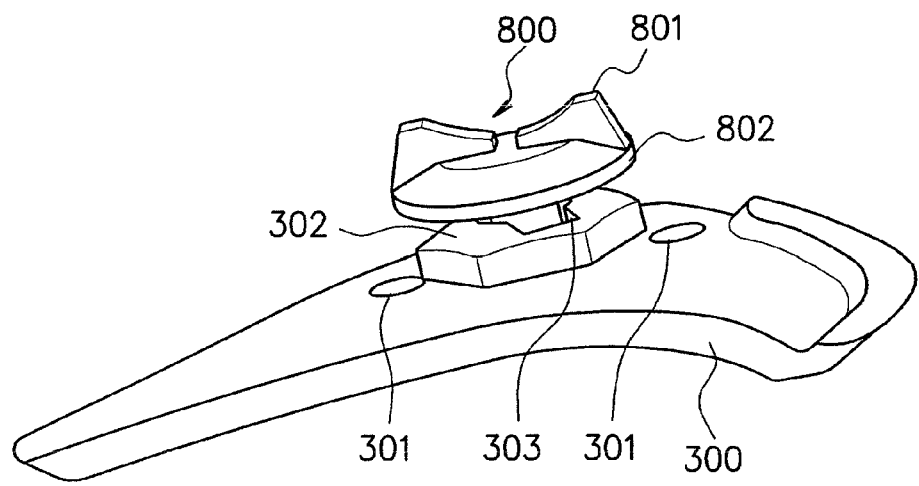
FIG. 9 is an enlarged main part view in a situation that a fastening member is inserted into a pedestal constituting a latching mechanism according to the present embodiment and then is rotated.
Figure 10:
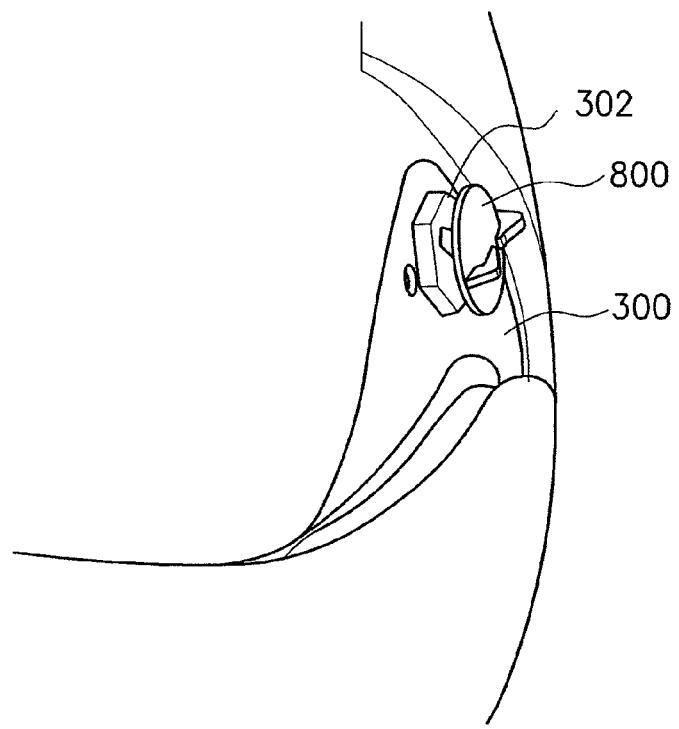
FIG. 10 is an enlarged main part view in a situation that a pedestal constituting a latching mechanism according to the present embodiment is fixed to a shell and then a fastening member is inserted and then rotated.
Figure 11:
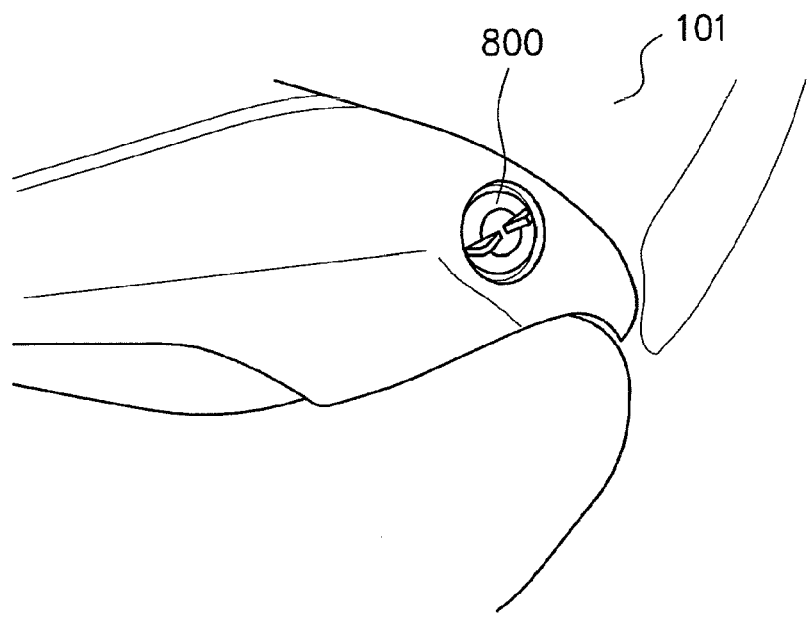
FIG. 11 is an enlarged main part view in a situation that a pedestal constituting a latching mechanism according to the present embodiment is fixed to a shell, then a visor is placed on the pedestal, and then a fastening member is inserted and then rotated.

FIG. 6A shows a top view and FIG. 6B shows a rear view of the external appearance of the pedestal constituting the latching mechanism according to the present embodiment. FIG. 7 is an enlarged main part view in a situation that the pedestal constituting the latching mechanism according to the present embodiment is placed on the shell. Further, FIG. 8A shows a top view, FIG. 8B shows a side view, and FIG. 8C shows a rear view of the external appearance of the fastening member constituting the latching mechanism according to the present embodiment. Further, FIG. 9 is an enlarged main part view in a situation that the fastening member is inserted into the pedestal constituting the latching mechanism according to the present embodiment and then is rotated. FIG. 10 is an enlarged main part view in a situation that the pedestal constituting the latching mechanism according to the present embodiment is fixed to the shell and then the fastening member is inserted and then rotated. FIG. 11 is an enlarged main part view in a situation that the pedestal constituting the latching mechanism according to the present embodiment is fixed to the shell, then the visor is placed on the pedestal, and then the fastening member is inserted and then rotated.

As shown in FIG. 6A, in the surface of the base plate 300, attachment holes 301 used for attaching the base plate 300 to the shell 101 with screws or the like are opened. Then, in a substantial center part of the base plate 300, a ridge part 302 is provided and a locking hole 303 is opened that has a circular hole in the center and has a substantially rectangular shape.

Further, as shown in FIG. 6B, in the rear face of the base plate 300, the locking part 304 is provided at a position reached by rotation by approximately 90 degrees from both ends of the locking hole 303.

As shown in FIG. 7, the base plate 300 is placed in each recess provided in vicinities of the temples at both right and left ends of the shell 101 and in a vicinity of the parietal region. Then, the base plate 300 is attached to the shell 101 with screws or the like through the attachment holes 301. As shown in FIGS. 8A to 8C, the clip 800 for connecting the visor 400 to the base plate 300 is constructed from: a leg part 803 inserted into and extracted from the locking hole 303 of the base plate 300 through the through hole 200 or the through hole 450 of the visor 400; a knob part 801 to be rotated when the leg part 803 is to be inserted into and extracted from the locking hole 303 of the base plate 300 through the through hole 200 or the through hole 450 of the visor 400; and a neck part 802 going into contact with the surface of the visor 400 when the visor 400 is mounted on the base plate 300, and connecting the knob part 801 to the leg part 803.

Then, although not shown in the figure, when the outer shape of the leg part 803 of the clip 800 viewed from the insertion direction is caused to fit exactly in the outer shape of the locking hole 303 of the base plate 300, the clip 800 becomes capable of being inserted into and pulled from the base plate 300. Further, as shown in FIGS. 9, 10, and 11, the knob part 801 of the clip 800 is rotated clockwise about an axis in the insertion direction so that the outer shape of the leg part 803 of the clip 800 viewed from the insertion direction is caused to intersect with the outer shape of the locking hole 303 of the base plate 300. Specifically, both end parts of the leg part 803 of the clip 800 are caused to abut against the locking part 304 (FIG. 6B). By virtue of this, the clip 800 is mounted onto the base plate 300.

Figure 12:
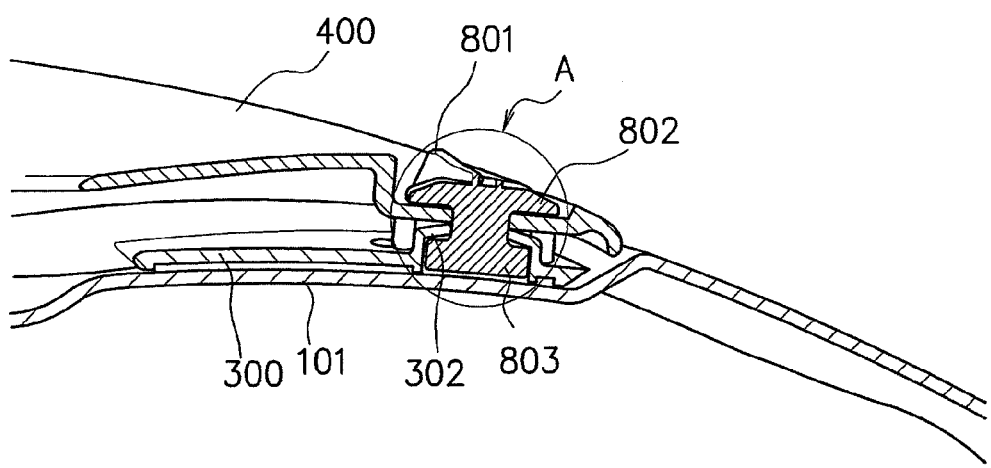
FIG. 12 is an enlarged main part sectional view in a situation that a pedestal constituting a latching mechanism according to the present embodiment is fixed to a shell, then a visor is placed on the pedestal, and then a fastening member is inserted and then rotated.
Figure 13:
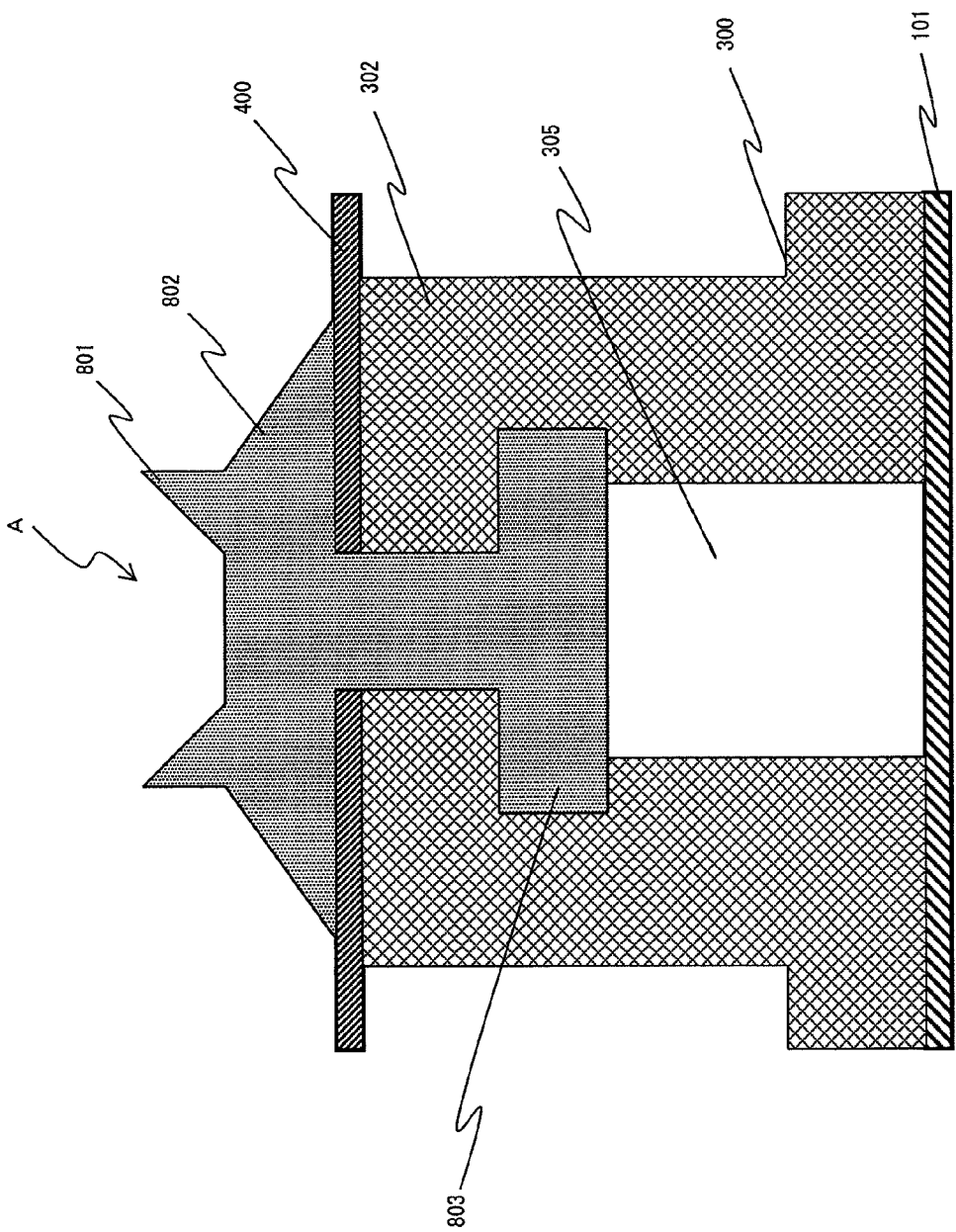
FIG. 13 is a schematic diagram of the part A in FIG. 12.
Figure 14:
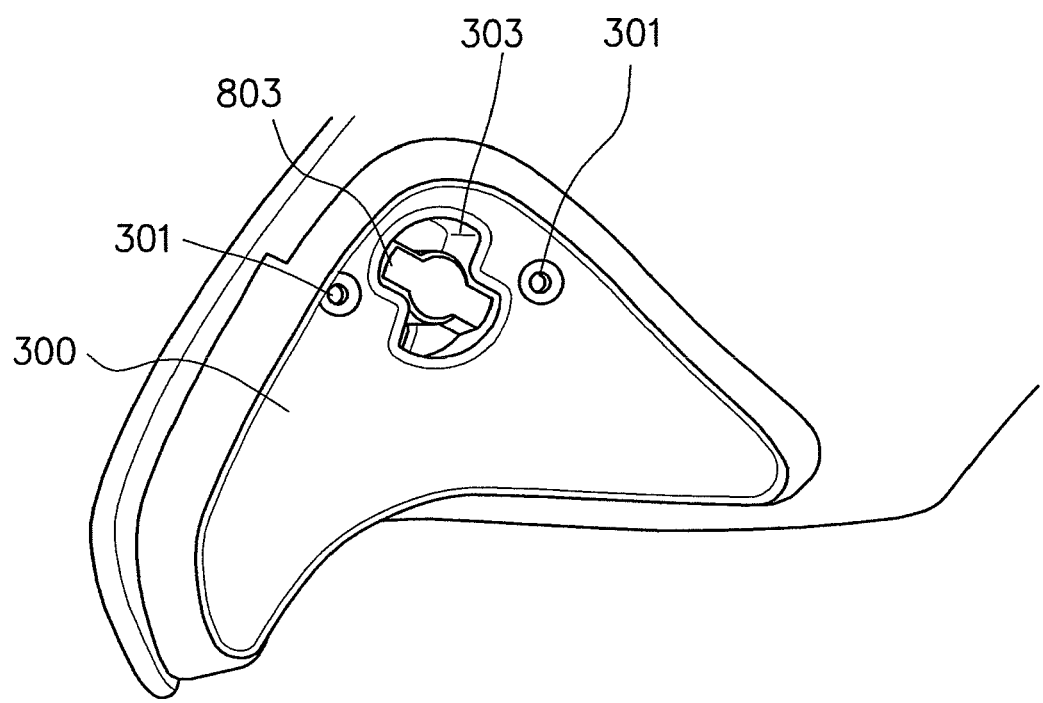
FIG. 14 is an enlarged main part rear view in a situation that a pedestal constituting a latching mechanism according to the present embodiment is fixed to a shell, then a visor is placed on the pedestal, and then a fastening member is inserted and then rotated.

Next, description is given for a main part in a situation that the pedestal constituting the latching mechanism according to the present embodiment is fixed to the shell, then the visor is placed on the pedestal, and then the fastening member is inserted and then rotated. FIG. 12 is an enlarged main part sectional view in a situation that the pedestal constituting the latching mechanism according to the present embodiment is fixed to the shell, then the visor is placed on the pedestal, and then the fastening member is inserted and then rotated. FIG. 13 is a schematic diagram of part A in FIG. 12. Further, FIG. 14 is an enlarged main part rear view in a situation that the pedestal constituting the latching mechanism according to the present embodiment is fixed to the shell, then the visor is placed on the pedestal, and then the fastening member is inserted and then rotated. Here, the following description is given for a case that the visor 400 is attached to the base plate 300 placed in each recess in vicinities of the temples at both right and left ends of the shell 101. However, the same situation holds also for a case that the visor 400 is attached to the base plate 300 placed in the recess in a vicinity of the parietal region of the shell 101.

As shown in FIG. 13, the base plate 300 fixed to the recess of the outer surface of the shell 101 is provided with a ridge part 302 which is raised portion, where there is an elongated and substantially rectangular shaped locking hole 303 (FIG. 6A) is opened at the top in order to hook the clip 800. An upper portion of the clip 800 is provided with a knob part 801 serving as a knob used for rotating the clip 800. Further, under the knob part 801, a neck part 802 extends in the horizontal directions so that the visor 400 is pressed against the base plate 300.

Further, under the neck part 802, there is a leg part 803 which has a shape so as to realize fixing when the leg part 803 penetrates the locking hole 303 of the base plate 300 and then the clip 800 is rotated by a necessity predetermined angle. Further, the visor 400 is provided with through holes 200 and a through hole 450 (FIG. 4) used for attachment to the base plate 300. The through holes 200 and the through hole 450 have a size and a shape sufficient for the penetration of the clip 800 and the pressing against the visor 400 by the neck part 802 of the clip 800.

When the visor 400 is to be attached to the shell 101, first, the visor 400 is placed such that the through holes 200 and the through hole 450 of the visor 400 fit exactly to the locking holes 303 on the base plate 300. Then, each clip 800 is penetrated from the visor 400 surface to the rear face of the base plate 300. Then, when the clip 800 is rotated, the end part of the leg part 803 of the clip 800 abuts against the locking part 304 so that the clip 800 is fixed to the base plate 300 and hence the visor 400 is locked to the base plate 300. Besides, when the clip 800 is rotated further or alternatively rotated reversely, the leg part 803 of the clip 800 is removed from the base plate 300 so that the visor 400 is separated from the base plate 300.

Yet detailed description is given below. As shown in FIGS. 12 and 13, the base plate 300 is placed and fixed onto the concave portion provided in a vicinity of the substantial temple portion of the shell 101 and then the position of the locking hole 303 opened in a substantial center part of the base plate 300 is fitted exactly to the through hole 200 of the visor 400 substantially congruent to the locking hole 303. Then, the leg part 803 of the clip 800 is inserted through the through hole 200 of the visor 400 into the locking hole 303 of the base plate 300.

Further, the knob part 801 of the clip 800 is rotated about an axis in the insertion direction so that the outer shape of the leg part 803 viewed from the insertion direction is caused to intersect with the outer shape of the through hole 200 and the locking hole 303. That is, as shown in FIG. 14, both end parts of the leg part 803 are caused to abut against the locking part 304 of the locking hole 303. By virtue of this, the visor 400 is locked to the base plate 300.

Then, when the knob part 801 of the clip 800 is rotated further about an axis in the insertion direction or alternatively rotated reversely, the engagement between the leg part 803 of the clip 800 and the locking part 304 of the base plate 300 is released so that the visor 400 is separated from the base plate 300.

Next, description is given for a main part in a situation that a pedestal constituting a latching mechanism according to another embodiment of the present invention is fixed to the shell, then the visor is placed on the pedestal, and then the fastening member is inserted and then rotated. FIG. 15 is an enlarged main part sectional view in a situation that the pedestal constituting the latching mechanism according to another embodiment of the present invention is fixed to the shell, then the visor is placed on the pedestal, and then the fastening member is inserted and then rotated.

The present invention holds as long as a space capable of accepting the leg part 803 of the clip 800 is provided in the inside of the ridge part 302 of the base plate 300. Thus, the shape of the space 305 is not limited to that described in FIG. 13 of the embodiment given above. That is, by the processing of making a protrusion part on the flat plate, the ridge part 302 and the space 305 shown in FIG. 13 can be obtained. The space 305 in this case is enclosed by the inner surface of the base plate 300 and the outer surface of the shell 101. Alternatively, by the processing of cutting a block shaped material, a ridge part 502 and a space 505 are realized as shown in FIG. 15. Then, the space 505 is an enough space to be able to rotate a leg part 903 of the clip 800. However, the space 505 in FIG. 15 is independent without relation to the outer surface of the shell 101.

Figure 16A:
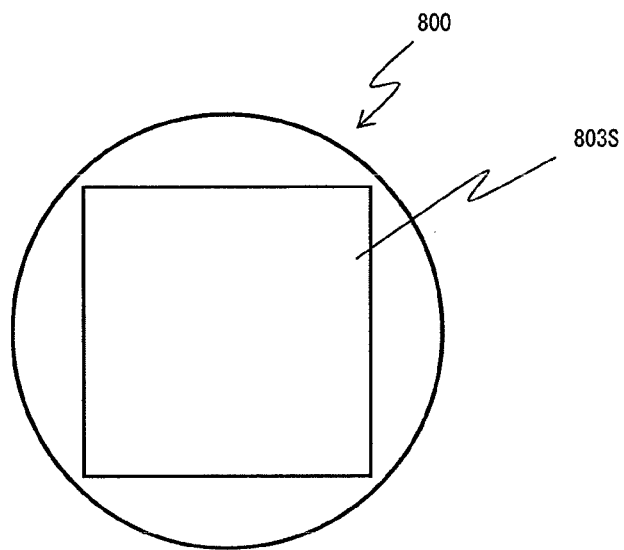
FIG. 16A shows a rear view of an external appearance of a coupling member constituting a latching mechanism and FIG. 16B shows an enlarged main part rear view in a situation that a fastening member is inserted into a pedestal constituting the latching mechanism and then rotated, according to yet another embodiment of the present invention.
Figure 16B:
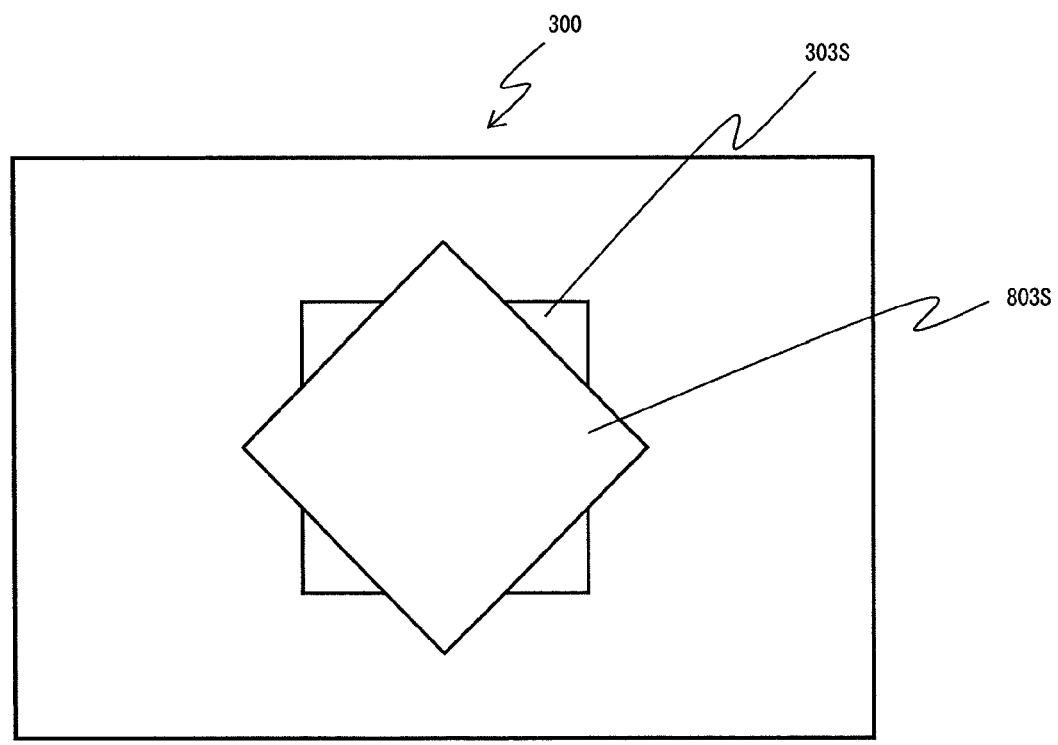

Next, description is given for: the external appearance of a coupling member constituting a latching mechanism according to yet another embodiment of the present invention; and a main part in a situation that the fastening member is inserted into the pedestal constituting the latching mechanism and then rotated. FIG. 16A shows a rear view of the external appearance of the coupling member constituting the latching mechanism and FIG. 16B shows an enlarged main part rear view in a situation that the fastening member is inserted into the pedestal constituting the latching mechanism and then rotated, according to yet another embodiment of the present invention.

As shown in FIG. 16A, the shape of the leg part 803S of the clip 800 is square in rear view. Then, in a state that the leg part 803S of the clip 800 is fitted exactly to the shape of a square hole 303S of the base plate 300 with a through hole (not shown) of the visor in between, the leg part 803S of the clip 800 is inserted into the square hole 303S of the base plate 300. After that, when the knob part 801 of the clip 800 is rotated about an axis in the insertion direction into a position where, as shown in FIG. 16B, in rear view of the base plate 300, the shape of the leg part 803S of the clip 800 does not fit exactly to (does intersect with) the shape of the square hole 303S of the base plate 300, the visor 400 is locked to the base plate 300.

Besides, when the knob part 801 of the clip 800 is rotated so that, in rear view of the base plate 300, the shape of the leg part 803S of the clip 800 is fitted exactly to the shape of the square hole 303S of the base plate 300, the visor 400 is separated from the base plate 300.

Figure 17A:
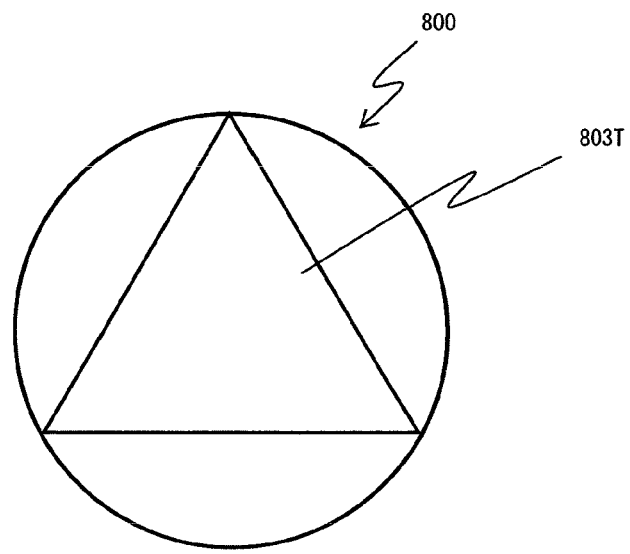
FIG. 17A shows a rear view of an external appearance of a coupling member constituting a latching mechanism and FIG. 17B shows an enlarged main part rear view in a situation that a fastening member is inserted into a pedestal constituting the latching mechanism and then rotated, according to yet another embodiment of the present invention.
Figure 17B:
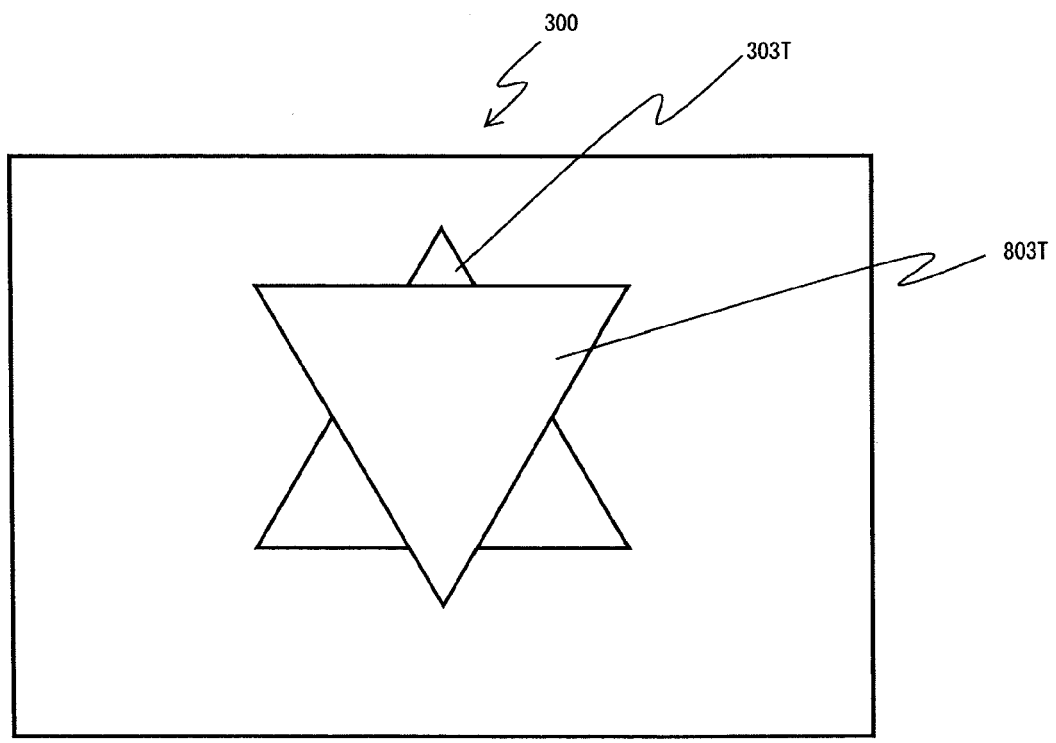

Next, description is given for: the external appearance of a coupling member constituting a latching mechanism according to yet another embodiment of the present invention; and a main part in a situation that the fastening member is inserted into the pedestal constituting the latching mechanism and then rotated. FIG. 17A shows a rear view of the external appearance of the coupling member constituting the latching mechanism and FIG. 17B shows an enlarged main part rear view in a situation that the fastening member is inserted into the pedestal constituting the latching mechanism and then rotated, according to yet another embodiment of the present invention.

As shown in FIG. 17A, the shape of the leg part 803T of the clip 800 is triangular in rear view. Then, in a state that the leg part 803T of the clip 800 is fitted exactly to the shape of a triangular hole 303T of the base plate 300 with a through hole (not shown) of the visor in between, the leg part 803T of the clip 800 is inserted into the triangular hole 303T of the base plate 300. After that, when the knob part 801 of the clip 800 is rotated about an axis in the insertion direction into a position where, as shown in FIG. 17B, in rear view of the base plate 300, the shape of the leg part 803T of the clip 800 does not fit exactly to (does intersect with) the shape of the triangular hole 303T of the base plate 300, the visor 400 is locked to the base plate 300.

Besides, when the knob part 801 of the clip 800 is rotated so that, in rear view of the base plate 300, the shape of the leg part 803T of the clip 800 is fitted exactly to the shape of the triangular hole 303T of the base plate 300, the visor 400 is separated from the base plate 300.

According to the present invention, a latching mechanism for helmet components and a helmet are provided in which the component can be attached and detached easily without causing a situation that a fixture for the helmet component is pushed into the helmet.

The present invention has been described above with reference to preferred embodiments of the present invention. Although the present invention has been described with reference to particular and specific examples, various modifications and changes may be made on these specific examples without departing from a wide variety of the spirit and the scope of the present invention set forth in the claims.

DESCRIPTION OF REFERENCE NUMERALS

100 Helmet
101 Shell (first member)
200 Through hole (second hole)
300, 500 Base plate (pedestal)
301 Attachment hole
302, 502 Ridge part
303 Locking hole (first hole)
303S Square hole
303T Triangular hole
304 Locking part
305, 505 Space
400 Visor (second member)

450 Through hole (third hole)
800 Clip (fastening member)
801, 901 Knob part
802, 902 Neck part
803, 803S, 803T, 903 Leg part

What is claimed is:

1. A helmet latching mechanism comprising: a pedestal fixed on a surface of a helmet, the helmet being provided as a first member, the pedestal being provided with a first hole in a substantial center part viewed from a position immediately above the surface; a second member placed on a surface of the pedestal and provided with a second hole substantially congruent to the first hole and opened at a position overlapping with the first hole; and a fastening member whose one end part is inserted into and pulled from the first hole through the second hole so that the second member is attached to the pedestal in an attachable and detachable manner, wherein the one end part is inserted through the second hole into the first hole and then the other end part opposite to the one end part is rotated about an axis in a direction of the insertion such that an outer shape of the one end part viewed from the direction of insertion intersects with an outer shape of the first hole and the second hole, so that the second member is mounted onto the pedestal, and wherein the other end part is rotated about an axis in the direction of insertion such that the outer shape of the one end part viewed from the direction of insertion fits exactly to the outer shape of the first hole and the second hole, so that the second member is separated from the pedestal.

2. The latching mechanism according to claim 1, wherein the pedestal includes: an attachment part for fixing to a surface of the first member; and a ridge part for supporting the second member.

3. The latching mechanism according to claim 1, wherein: the one end part is a leg part inserted into the first hole and the second hole; the other end part is a knob part used for the rotating; and a neck part is included that connects the one end part to the other end part and that is in contact with a surface of the second member.

4. The latching mechanism according to claim 2, wherein: the one end part is a leg part inserted into the first hole and the second hole; the other end part is a knob part used for the rotating; and a neck part is included that connects the one end part to the other end part and that is in contact with a surface of the second member.

5. A helmet provided with a latching mechanism comprising:
a pedestal fixed on a surface of a shell and provided with a first hole in a substantial center part viewed from a position immediately above the surface;
a visor placed on a surface of the pedestal and provided with a second hole substantially congruent to the first hole and opened at a position overlapping with the first hole; and
a fastening member whose one end part is inserted into and pulled from the first hole through the second hole so that the visor is attached to the pedestal in an attachable and detachable manner, wherein
the one end part is inserted through the second hole into the first hole and then the other end part opposite to the one end part is rotated about an axis in a direction of the insertion such that an outer shape of the one end part viewed from the direction of insertion intersects with an outer shape of the first hole and the second hole, so that the visor is mounted onto the pedestal, and wherein the other end part is rotated about an axis in the direction of insertion such that the outer shape of the one end part viewed from the direction of insertion fits exactly to the outer shape of the first hole and the second hole, so that the visor is separated from the pedestal.

6. The helmet according to claim 5, wherein the pedestal includes: an attachment part for fixing to a surface of the shell; and a ridge part for supporting the visor.

7. The helmet according to claim 5, wherein: the one end part is a leg part inserted into the first hole and the second hole; the other end part is a knob part used for the rotating; and a neck part is included that connects the one end part to the other end part and that is in contact with a surface of the visor.

8. The helmet according to claim 6, wherein: the one end part is a leg part inserted into the first hole and the second hole; the other end part is a knob part used for the rotating; and a neck part is included that connects the one end part to the other end part and that is in contact with a surface of the visor.

9. The helmet according to claim 5, wherein: the visor is provided with a third hole substantially congruent to the second hole and opened at a position overlapping with the first hole; the fastening member is inserted into and pulled from the first hole through the third hole so that the visor is attached to the pedestal in an attachable and detachable manner; the one end part is inserted through the third hole into the first hole and then the other end part is rotated about an axis in the direction of insertion such that an outer shape of the one end part viewed from the direction of insertion intersects with an outer shape of the first hole and the third hole, so that the visor is mounted onto the pedestal; and the other end part is rotated about an axis in the direction of insertion such that the outer shape of the one end part viewed from the direction of insertion fits exactly to the outer shape of the first hole and the third hole, the visor is separated from the pedestal.

10. The helmet according to claim 6, wherein: the visor is provided with a third hole substantially congruent to the second hole and opened at a position overlapping with the first hole; the fastening member is inserted into and pulled from the first hole through the third hole so that the visor is attached to the pedestal in an attachable and detachable manner; the one end part is inserted through the third hole into the first hole and then the other end part is rotated about an axis in the direction of insertion such that an outer shape of the one end part viewed from the direction of insertion intersects with an outer shape of the first hole and the third hole, so that the visor is mounted onto the pedestal; and the other end part is rotated about an axis in the direction of insertion such that the outer shape of the one end part viewed from the direction of insertion fits exactly to the outer shape of the first hole and the third hole, the visor is separated from the pedestal.

11. The helmet according to claim 7, wherein: the visor is provided with a third hole substantially congruent to the second hole and opened at a position overlapping with the first hole; the fastening member is inserted into and pulled from the first hole through the third hole so that the visor is attached to the pedestal in an attachable and detachable manner; the one end part is inserted through the third hole into the first hole and then the other end part is rotated about an axis in the direction of insertion such that an outer shape of the one end part viewed from the direction of insertion intersects with an outer shape of the first hole and the third hole, so that the visor is mounted onto the pedestal; and the other end part is rotated about an axis in the direction of insertion such that the outer shape of the one end part viewed from the direction of insertion fits exactly to the outer shape of the first hole and the third hole, the visor is separated from the pedestal.

12. The helmet according to claim 8, wherein: the visor is provided with a third hole substantially congruent to the second hole and opened at a position overlapping with the first hole; the fastening member is inserted into and pulled from the first hole through the third hole so that the visor is attached to the pedestal in an attachable and detachable manner; the one end part is inserted through the third hole into the first hole and then the other end part is rotated about an axis in the direction of insertion such that an outer shape of the one end part viewed from the direction of insertion intersects with an outer shape of the first hole and the third hole, so that the visor is mounted onto the pedestal; and the other end part is rotated about an axis in the direction of insertion such that the outer shape of the one end part viewed from the direction of insertion fits exactly to the outer shape of the first hole and the third hole, the visor is separated from the pedestal.

13. The helmet according to claim 9, wherein: the second hole is provided in a vicinity of a temple part in a situation that the visor is mounted onto the shell; and the third hole is provided in a vicinity of a parietal region in a situation that the visor is mounted onto the shell.

14. The helmet according to claim 10, wherein: the second hole is provided in a vicinity of a temple part in a situation that the visor is mounted onto the shell; and the third hole is provided in a vicinity of a parietal region in a situation that the visor is mounted onto the shell.

15. The helmet according to claim 11, wherein: the second hole is provided in a vicinity of a temple part in a situation that the visor is mounted onto the shell; and the third hole is provided in a vicinity of a parietal region in a situation that the visor is mounted onto the shell.

16. The helmet according to claim 12, wherein: the second hole is provided in a vicinity of a temple part in a situation that the visor is mounted onto the shell; and the third hole is provided in a vicinity of a parietal region in a situation that the visor is mounted onto the shell.

* * * * *